(12) United States Patent
Xue et al.

(10) Patent No.: US 12,352,209 B1
(45) Date of Patent: Jul. 8, 2025

(54) AIRCRAFT ENGINE FLUID SEPARATION SYSTEM AND METHOD

(71) Applicant: PRATT & WHITNEY CANADA CORP., Longueuil (CA)

(72) Inventors: Liam Xue, Toronto (CA); Ivan Sidorovich Paradiso, Toronto (CA); Laslo Tibor Diosady, Etobicoke (CA); David Koo, Toronto (CA); Gabriel Naccache, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/753,124

(22) Filed: Jun. 25, 2024

(51) Int. Cl.
*F02C 7/06* (2006.01)

(52) U.S. Cl.
CPC .......... *F02C 7/06* (2013.01); *F05D 2220/323* (2013.01); *F05D 2260/98* (2013.01)

(58) Field of Classification Search
CPC .. F02C 7/06; F05D 2220/323; F05D 2260/98; F16N 39/002; F16N 2210/02
USPC ....................................................... 184/6.11
See application file for complete search history.

(56) References Cited

U.S. PATENT DOCUMENTS

| | | | |
|---|---|---|---|
| 7,566,356 B2 | 7/2009 | Latulipe et al. | |
| 10,422,476 B2 | 9/2019 | Norem et al. | |
| 11,162,494 B2 | 11/2021 | Alecu et al. | |
| 11,371,434 B2 | 6/2022 | Pearson et al. | |
| 11,383,854 B2 | 7/2022 | Blewett et al. | |
| 11,566,563 B2 | 1/2023 | Wilson | |
| 11,867,357 B1 | 1/2024 | Sidorovich Paradiso | |
| 2002/0007736 A1* | 1/2002 | Hearn | B01D 19/0057 96/209 |
| 2021/0079845 A1* | 3/2021 | Wilson | F02C 7/36 |
| 2022/0233973 A1 | 7/2022 | Caron et al. | |

* cited by examiner

*Primary Examiner* — Steven M Sutherland
(74) *Attorney, Agent, or Firm* — NORTON ROSE FULBRIGHT CANADA LLP

(57) ABSTRACT

An oil system for an aircraft engine includes an oil tank, an engine component in fluid communication with the oil tank, a scavenge pump, and a manifold disposed inside the scavenge pump housing and fluidly connecting the engine component to the scavenge pump. The manifold includes a fluid passage, extending between a manifold inlet and a manifold outlet, and including a first bend, upstream, and a second bend. The first bend includes an oil isolator and the second bend includes an air offtake. The oil isolator separates an oil fraction from the fluid received from the engine component at the first bend and directs the oil fraction to the scavenge pump, and the air offtake separates an air fraction from the fluid at the second bend and directs the air fraction away from the scavenge pump.

20 Claims, 5 Drawing Sheets

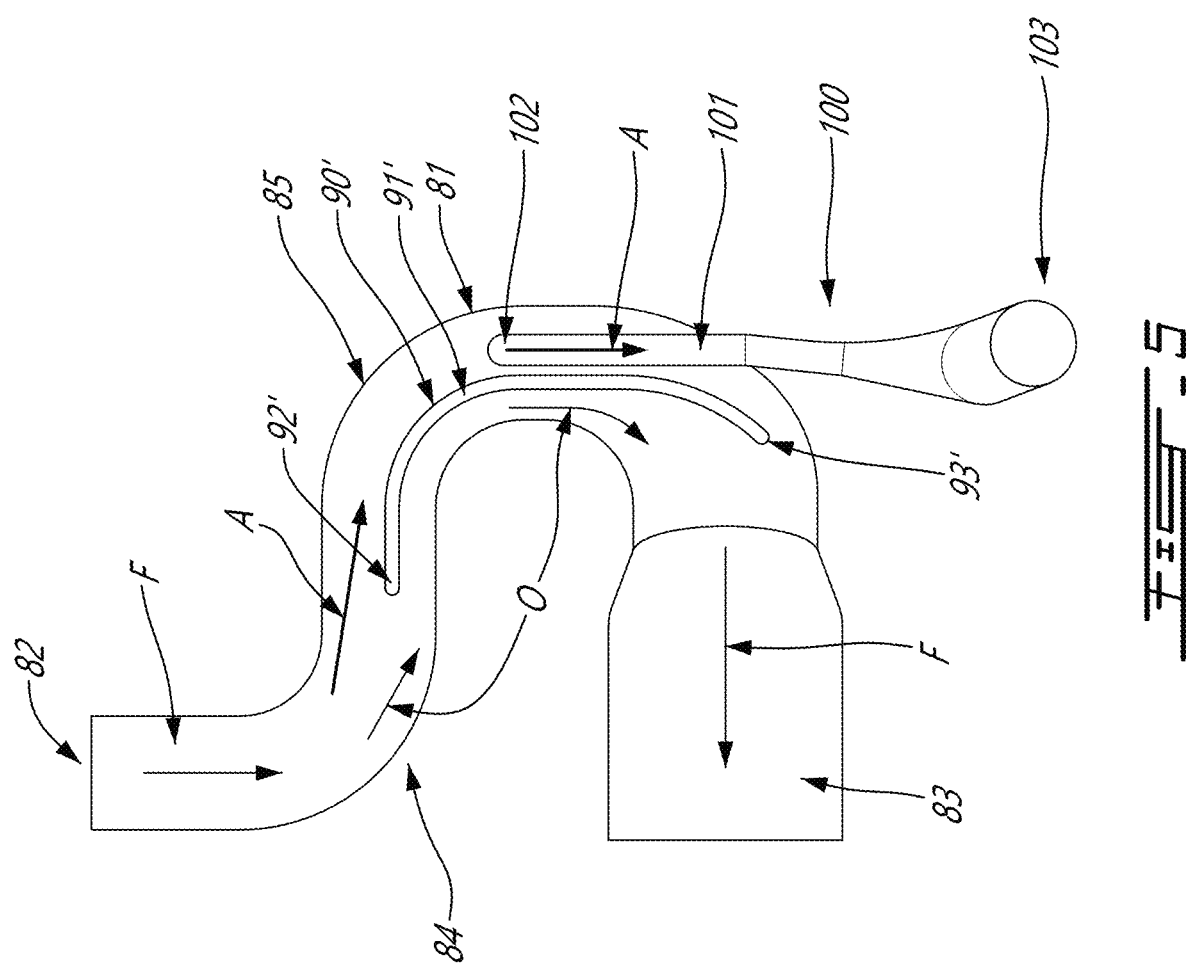

AIRCRAFT ENGINE FLUID SEPARATION SYSTEM AND METHOD

TECHNICAL FIELD

The disclosure relates generally to aircraft engine oil systems.

BACKGROUND

Aircraft engine oil systems typically include scavenge pumps, which are used for instance to flow oil scavenged from a bearing cavity, gearbox or other engine component containing oil back towards the oil tank. Often, the scavenged oil flow contains a mixture of oil and air. It is desirable for at least some of the air to be separated from the mixture, to improve the efficiency and efficacy of the oil system. While previous attempts have been made to separate air from the scavenged oil mixture, improvements are desired.

SUMMARY

In one aspect, there is provided an oil system for an aircraft engine, comprising: an oil tank; an engine component in fluid communication with the oil tank, a fluid containing a mixture of air and oil being discharged from the engine component; a scavenge pump having a scavenge pump inlet fluidly connected to the engine component and a scavenge pump outlet fluidly connected to the oil tank; and a manifold disposed inside the scavenge pump housing and fluidly connecting the engine component to the scavenge pump, the manifold having a manifold inlet fluidly connected to the engine component and a manifold outlet fluidly connected to the scavenge pump inlet, the manifold including a fluid passage extending between the manifold inlet and the manifold outlet, the fluid passage including a first bend and a second bend, the first bend being upstream from the second bend, the first bend including an oil isolator and the second bend including an air offtake, the oil isolator separating an oil fraction from the fluid at the first bend and directing the oil fraction to the scavenge pump, the air offtake separating an air fraction from the fluid at the second bend and directing the air fraction away from the scavenge pump.

The oil system as defined above and described herein may further include one or more of the following features, in whole or in part, and in any combination.

In certain aspects, the oil isolator includes an oil offtake disposed at a radially outer portion of the first bend, the oil offtake flowing the oil fraction to the scavenge pump.

In certain aspects, an inlet to the oil offtake is fluidly coupled to the manifold in a direction substantially tangent to the first bend.

In certain aspects, an inlet to the oil offtake is fluidly connected to the manifold at a location corresponding to an angle of at least 60 degrees along the first bend with respect to a plane upstream of the first bend, the plane extending normally through the manifold.

In certain aspects, an outlet of the oil offtake is fluidly connected to the manifold at the manifold outlet.

In certain aspects, the oil isolator includes a wall inside the manifold, the wall extending from a leading edge downstream of the first bend to a trailing edge, the wall forming a first flow path and a second flow path fluidly isolated from the first flow path along a length of the wall.

In certain aspects, the leading edge is disposed immediately downstream of the first bend.

In certain aspects, the trailing edge is disposed downstream of the air offtake.

In certain aspects, the trailing edge fluidly separates the second flow path from the manifold outlet.

In certain aspects, the manifold is disposed inside a housing of the scavenge pump.

In accordance with another aspect, there is also provided a scavenge pump assembly for an aircraft engine, comprising: a scavenge pump housing; a scavenge pump disposed inside the scavenge pump housing; and a manifold adapted to flow a fluid containing a mixture of air and oil to the scavenge pump, the manifold including a manifold inlet, a manifold outlet fluidly connected to the scavenge pump, and a fluid passage extending between the manifold inlet and the manifold outlet, the fluid passage including a first bend and a second bend, the first bend being upstream from the second bend, the first bend including an oil isolator and the second bend including an air offtake, the oil isolator separating an oil fraction from the fluid at the first bend and directing the oil fraction to the scavenge pump, the air offtake separating an air fraction from the fluid at the second bend and directing the air fraction away from the scavenge pump.

The scavenge pump assembly as defined above and described herein may further include one or more of the following features, in whole or in part, and in any combination.

In certain aspects, the oil isolator includes an oil offtake having an oil offtake inlet disposed at a radially outer portion of the first bend and an oil offtake outlet in fluid communication with the scavenge pump.

In certain aspects, the oil offtake inlet is fluidly coupled to the manifold in a direction tangent to the first bend.

In certain aspects, the oil offtake inlet is fluidly connected to the manifold at a location corresponding to an angle of at least 60 degrees along the first bend with respect to a plane upstream of the first bend, the plane extending normally through the manifold.

In certain aspects, the oil offtake outlet is fluidly connected to the manifold at the manifold outlet.

In certain aspects, the oil isolator includes a wall inside the manifold, the wall extending from a leading edge downstream of the first bend to a trailing edge, the wall forming a first flow path and a second flow path fluidly isolated from the first flow path along a length of the wall.

In certain aspects, the leading edge is disposed immediately downstream of the first bend.

In certain aspects, the trailing edge is disposed downstream of the air offtake.

In certain aspects, the trailing edge fluidly separates the second flow path from the manifold outlet.

In accordance with another aspect, there is further provided a method of operating an oil system in an aircraft engine, comprising: flowing a fluid containing a mixture of air and oil recovered from an engine component of the aircraft engine through an inlet of a manifold, the manifold having an outlet fluidly coupled to a scavenge pump; separating oil from the fluid at a first bend in the manifold and directing the oil to the scavenge pump; and separating air from the fluid at a second bend in the manifold and directing the air away from the scavenge pump.

BRIEF DESCRIPTION OF THE DRAWINGS

Reference is now made to the accompanying figures in which:

FIG. 5 is a schematic cross-sectional view of an oil manifold for the scavenge pump housing of FIG. 3, according to another embodiment.

DETAILED DESCRIPTION

Figure 1:
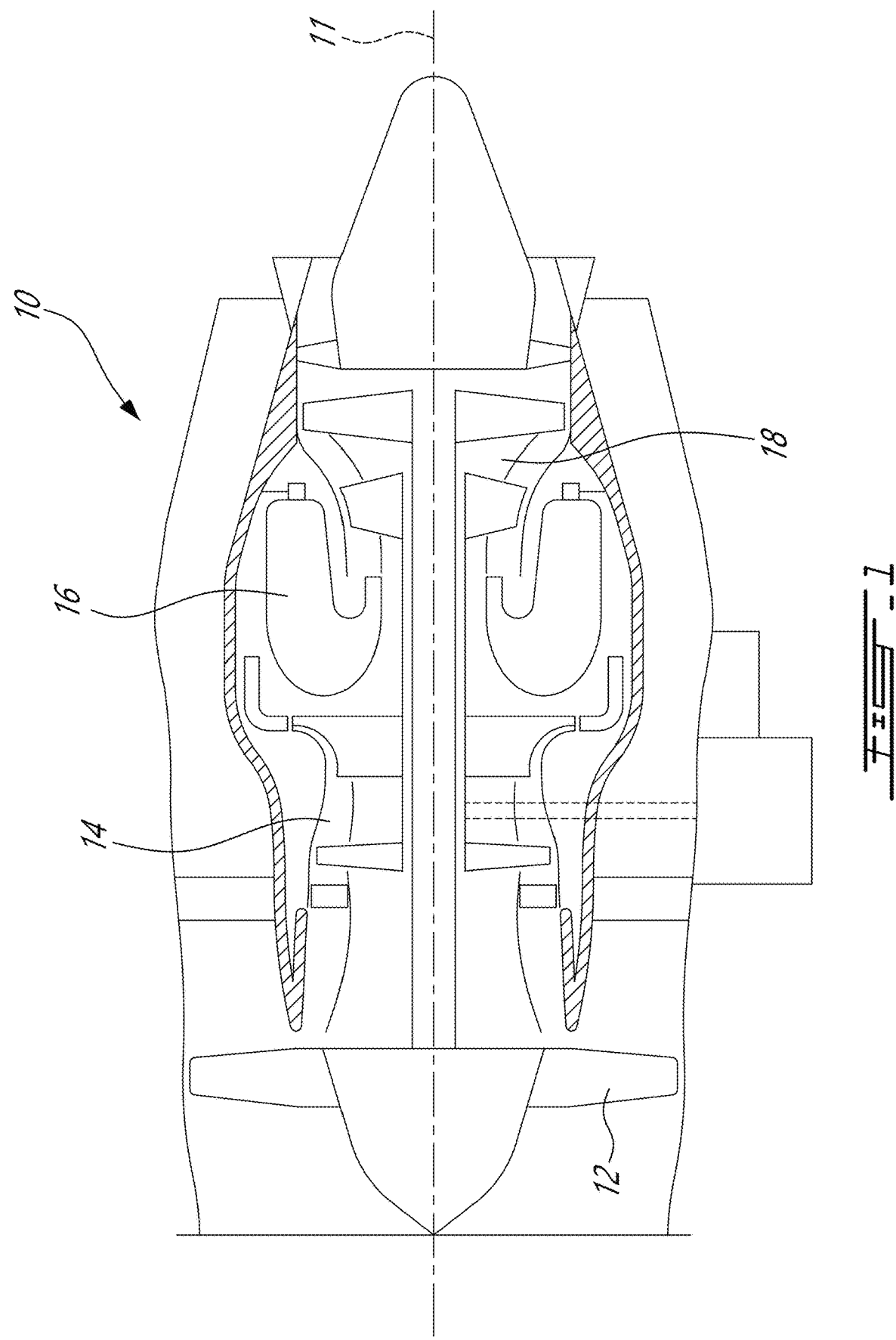
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. While FIG. 1 shows engine 10 as being a turbofan engine, it is understood that the present disclosure may apply to other types of aircraft engines such as turboprop engines, turboshaft engines, and hybrid electric engines.

Figure 2:
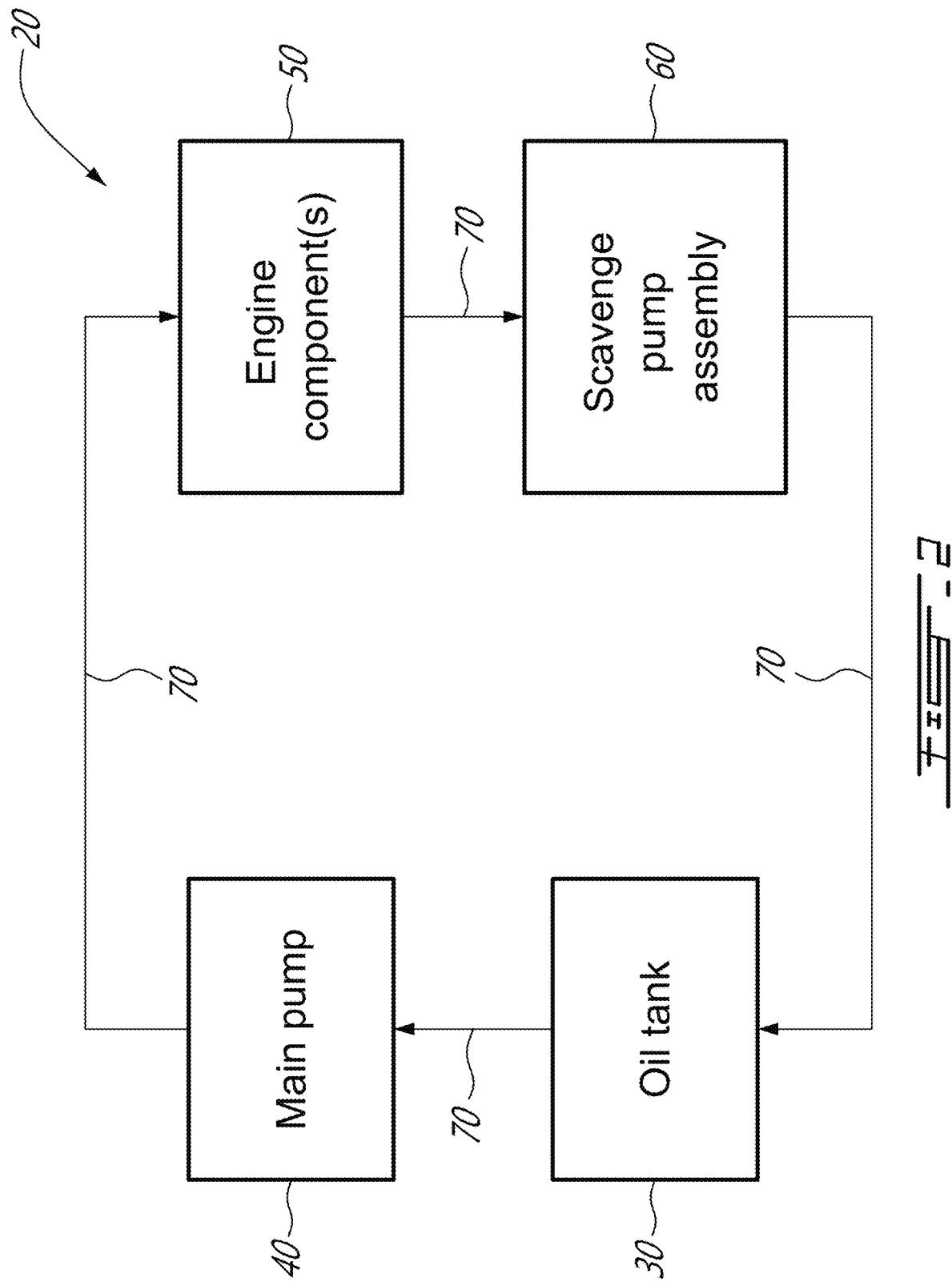
FIG. 2 is a diagram illustrating an exemplary oil system for the engine of FIG. 1.

Referring now to FIG. 2, an exemplary oil system 20 for the engine 10 is shown. The depicted oil system 20 includes an oil tank 30, a main pump 40, one or more engine components 50, and a scavenge pump assembly 60. The oil tank 30 is fluidly connected to the one or more engine components 50 via the main pump 40 to provide oil thereto, for instance for cooling and/or lubrication. The one or more engine components 50 include, for instance, a bearing cavity or a gearbox. Other engine components 50 receiving oil from the oil tank 30 may be contemplated. A scavenge pump assembly 60 is fluidly connected to the one or more engine components 50 and is adapted to collect or scavenge oil being discharged from the one or more engine components 50 and flow the oil back to the oil tank 30. Various conduits 70 are provided for the flowing of oil to and from the various components. It is understood that other components may form part of the oil system 20, such as additional engine components 50, one or more filters, one or more nozzles, and one or more additional pumps.

Although FIG. 2 depicts the path of oil flow in the oil system 20, it is to be understood that air will also be entrained in the oil flow, as described herein. More particularly, air can be drawn into the oil system at and/or via the engine component(s) 50, and as such the air/oil mixture will flow downstream to the scavenge pump assembly 60 and then on to the oil tank 30. The scavenge pump assembly 60 of the present disclosure will however help to extract most of the air (e.g., at least a majority (over 50%), if not more (e.g., more than 75%)) from the air/oil mixture. As such, the separation of the ail from the oil system, as described in the present disclosure, occurs downstream of the engine component(s) 50 and upstream of, or at, the scavenge pump 60, but in all cases not downstream of the scavenge pump. The air extracted from the mixture upstream of the scavenge pump may be discharged from the oil system in a suitable manner. In certain embodiments, the air (and any relatively small amounts of oil therein) withdrawn from the main ail/oil mixture by the present scavenge pump assembly 60 may be directed to a gear box, such as an accessory gear box (AGB), which includes a breather to fully removal all or almost all air from the oil system and dump this air outside of the engine 10. Similarly, air (and any relatively small amounts of oil still therein) may also be directed out of the oil tank 30 and into the AGB, for extraction of all of the air from the system.

Figure 3:
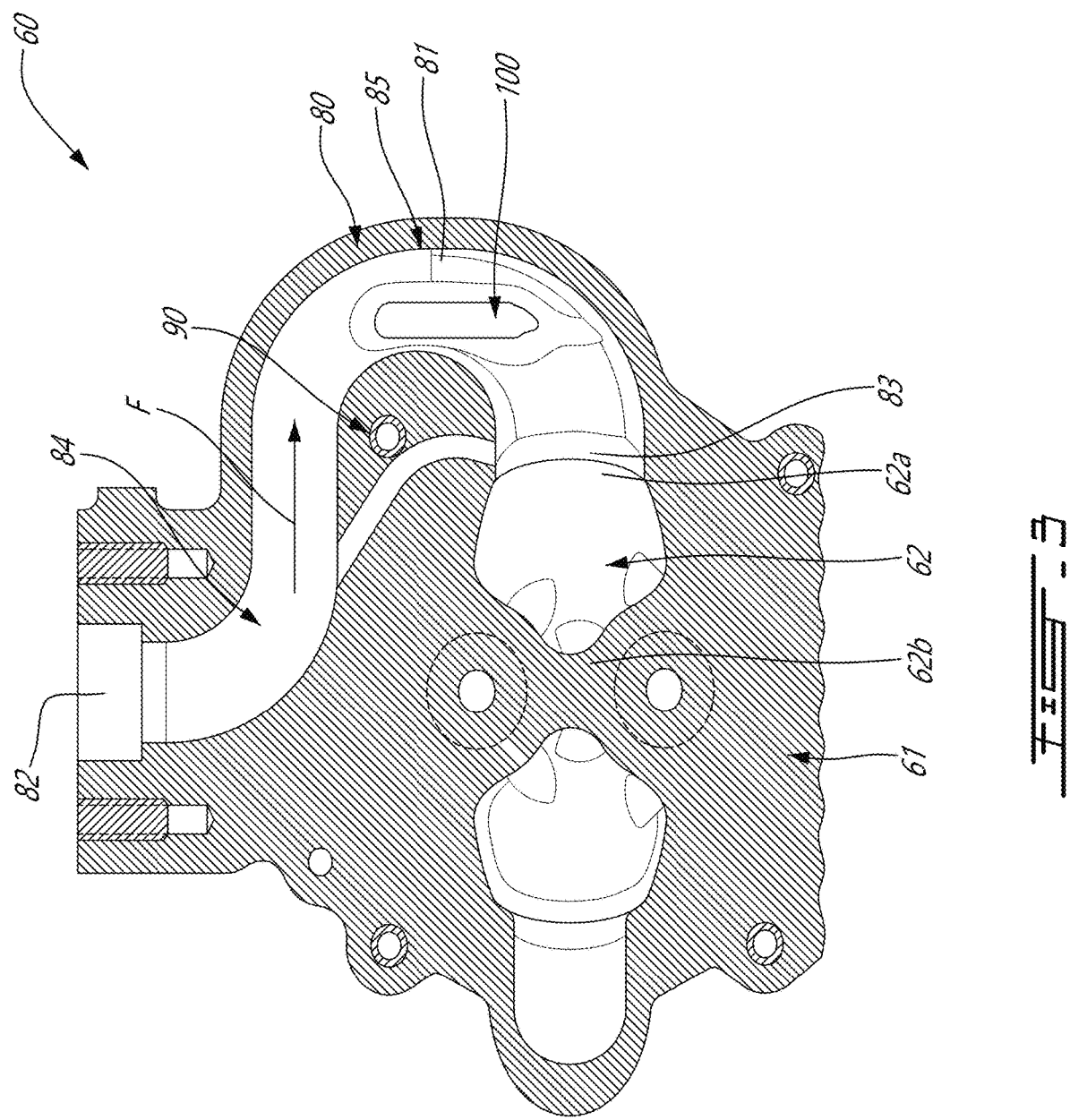
FIG. 3 is a schematic cross sectional view of a scavenge pump system for the oil system of FIG. 2, according to an embodiment.

Referring now to FIG. 3, an exemplary scavenge pump assembly 60 is shown. As discussed above, the scavenge pump assembly 60 is adapted to collect or scavenge oil being discharged from the one or more engine components 50. The depicted scavenge system 60 includes a scavenge pump housing 61, also referred to as a cavity, a scavenge pump 62, and a manifold 80. The manifold is adapted to flow the oil collected from the one or more engine component 50 cavities to the scavenge pump 62. The oil is scavenged or collected, for instance, via gravity drain and due to the suction from the scavenge pump 62. In the shown case, the manifold 80 is disposed inside the scavenge pump housing 62. In other cases, the manifold 80 is disposed outside the scavenge pump housing 62. In yet other cases, the manifold 80 is partially disposed both inside and outside the scavenge pump housing 62. In all cases, the manifold 80 is fluidly disposed downstream of the one or more engine components 50 and upstream of the scavenge pump 62. The depicted scavenge pump includes a scavenge pump inlet 62a fluidly connected to the one or more engine components 50 via the manifold 80 and a scavenge pump outlet 62b fluidly connected to the oil tank 30.

The depicted manifold 80 includes a manifold body 81, also referred to as a conduit or tubing, having a manifold inlet 82 fluidly connected to the one or more engine components 50 and a manifold outlet 83 fluidly connected to the scavenge pump 62. In some cases, the manifold inlet 82 is fluidly connected to the one or more engine components 50 via conduit(s) 70. In other cases, the manifold inlet 82 is directly connected to one of the one or more engine components 50. In some cases, the manifold 80 includes a plurality of manifold inlets 82 that converge into the manifold body 81.

Under typical engine 10 operations, the oil flowing through the oil system 20 can mix with air, for instance in the one or more engine components 50, forming a fluid F containing a mixture of air and oil. To maximize the efficiency of the oil system 20, it is desirable to separate or remove at least some of the air from the fluid F, for instance before the fluid F is returned to the oil tank 30. Advantageously, the depicted manifold 80 is adapted to separate at least some of the air from the fluid F scavenged from the one or more engine components 50 before the fluid F is returned to the oil tank 30. Stated differently, the manifold 80 is adapted to increase the concentration of oil in the fluid F (i.e., render the fluid more oil-rich) by separating and removing air from the fluid F. The manifold 80 is further adapted to separate oil from the fluid F and provide a more direct path for the separated oil to the scavenge pump 62. The manifold is thus provided with an oil isolator 90 adapted to direct separated oil to the scavenge pump 62 and an air offtake 100 adapted to flow separated air away from the scavenge pump 62. Various configurations for the above-described separation may be contemplated, as will be discussed in further detail below.

Figure 4:
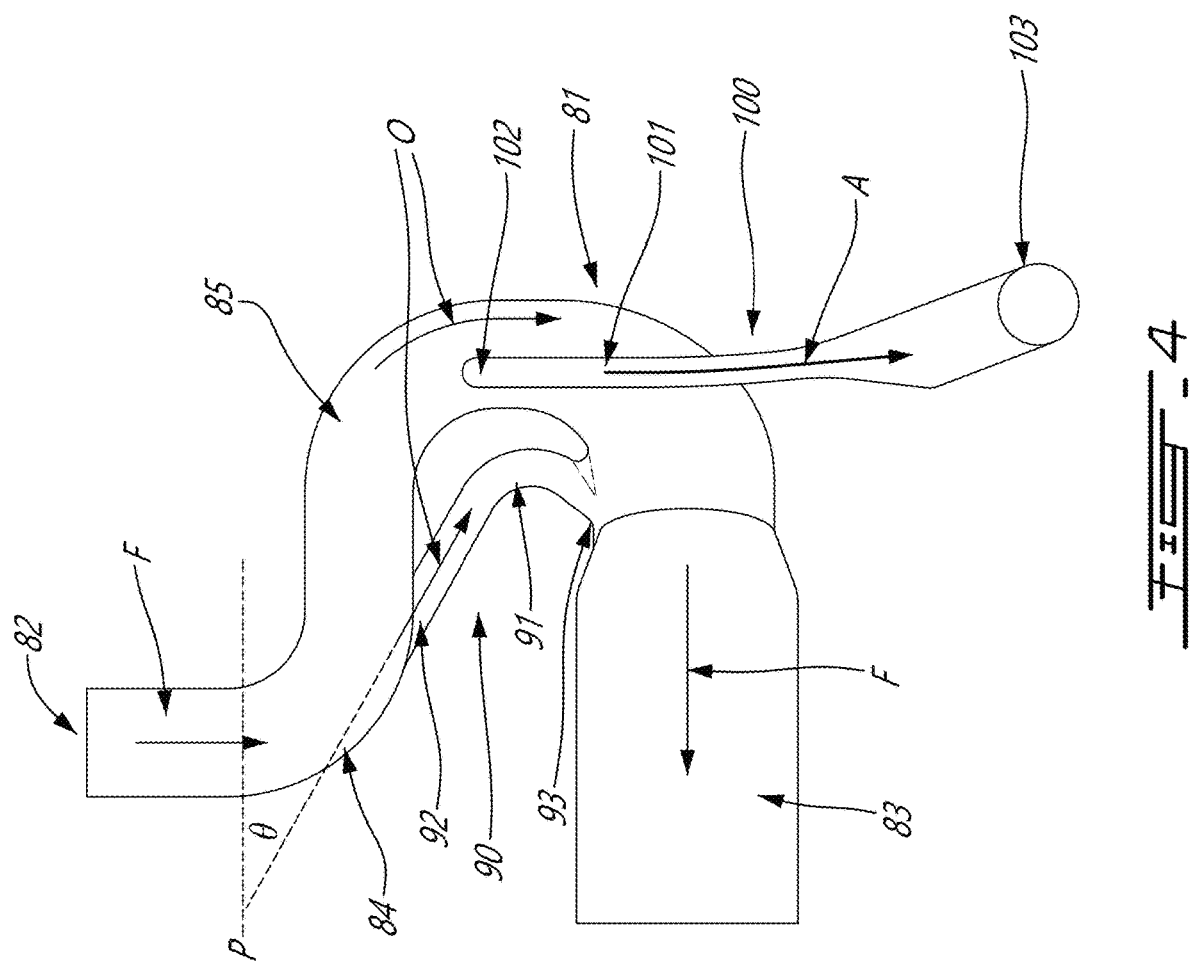
FIG. 4 is schematic cross-sectional view of an oil manifold for the scavenge pump housing of FIG. 3.

Referring to FIG. 4 in addition to FIG. 3, an embodiment of a manifold 80 is shown. The depicted manifold body 81 includes fluid passage extending from the manifold inlet 82 and the manifold outlet 83, through the body of the manifold. The fluid passage includes a first bend 84, also referred to as an upstream bend, and a second bend 85, also referred to as a downstream bend. The first bend 84 is disposed upstream of the second bend 85. In the shown case, the oil isolator 90 is disposed adjacent to the first bend 84, while the air offtake 100 is disposed adjacent the second bend 85. As the fluid F flows through the bends 84, 85, centrifugal forces acting on the fluid F cause the oil O in the fluid F to displace towards outer radial portions of the bends 84, 85 while the air A, which is less dense than the oil O, displaces towards the inner radial portions of the bends 84, 85. As such, as the fluid F enters the manifold, at least some of the oil O and air F are separated from the fluid F at the first and second bends 84, 85. At least some of the separated oil O is directed towards the scavenge pump inlet 62a via the oil isolator 90 adjacent the first bend 84, while at least some of the separated air A is separated from the fluid F via the air offtake 100 adjacent the second bend 85 and directed towards another location in the engine 10 (i.e., away from the scavenge pump 62). This separation process is said to be a passive, in situ separation process, as the shape of the manifold 80, i.e., the bends 84, 85, causes on-site separation of the air A and oil O flowing therethrough. The first bend 84 illustratively diverts the flow of the fluid F by about 90 degrees, while the second bend 85 illustratively diverts the flow of the fluid F by about 180 degrees. Other configurations may be contemplated.

In the embodiment shown in FIGS. 3 and 4, the oil isolator 90 is an oil offtake 90 separating a volume of oil O, also referred to herein as an oil fraction, from the fluid F at the first bend 84 towards the scavenge pump inlet 62a. It is to be understood that the oil fraction may be all of the oil present in the air-oil mixture, or only a portion of the oil (e.g., a majority—over 50%—of the oil) in the air-oil mixture. The oil offtake 90 includes a body 91 having an oil offtake inlet 92 fluidly connected to the manifold 80 adjacent to the first bend 84 and an oil offtake outlet 93 fluidly connected to the manifold 80 adjacent the manifold outlet 83. The oil offtake inlet 92 is illustratively disposed at a radially outer portion of the first bend 84 so that the oil O separated from the fluid F via centrifugal forces is directed into the oil offtake 90. In the shown case, the oil offtake inlet 92 is disposed at the downstream end of the first bend 84 in a direction substantially tangent to the first bend 84. The term substantially tangent, as used herein, is understood to mean precisely tangent or +5 degrees away from tangent. Illustratively, the oil offtake inlet 92 is disposed at a location corresponding to an angle θ of at least 60 degrees along the first bend 84 relative to a horizontal plane P upstream of the first bend 84, the horizontal plane P extending normally through the manifold 80 at this location. Other locations and directions for the oil offtake inlet 82 may be contemplated.

In the shown case, the oil offtake 90 is adapted to return the separated oil O to the manifold 80 adjacent to the manifold outlet 83, i.e., upstream of the scavenge pump inlet 62a. In other cases, the oil offtake 90 directs the separated oil O directly to the scavenge pump inlet 62a, for instance in parallel with the manifold outlet 83. The body 91 of the oil offtake 90 is illustratively curved, although other shapes may be contemplated, for instance based on the shape of the manifold body 81 or the expected flow rate of the oil O through the oil offtake 90. The diameter of the body 91 of the oil offtake 90 may vary, for instance based on the expected flow rate of oil O flowing therethrough. Illustratively, the diameter of the body 91 is about half of a diameter of the manifold body 81.

Still referring to FIGS. 3 and 4, the depicted air offtake 100 includes a body 101 having an air offtake inlet 102 fluidly connected to the manifold body 81 adjacent the second bend 85, and an air offtake outlet 103 fluidly connected to another engine component or location away from the scavenge pump 62. In some cases, the air offtake outlet 103 is fluidly connected to a gearbox of the engine 10 to deliver separated air A thereto. Other destinations for the air A via the air offtake 100, for instance overboard the aircraft, may be contemplated. The depicted air offtake inlet 102 is fluidly connected to the manifold body 81 at a radially inner portion of the second bend 85 so that a volume of air A, also referred to as an air fraction, separated from the fluid F due to centrifugal forces is directed through the air offtake inlet 102. This air fraction may be all of the air in the air-oil mixture, or a portion of the air (e.g., a majority-over 50%) in the air-oil mixture. The remaining oil O in the manifold 80 at the second bend 85 is directed to the radially outer portion of the second bend 85, i.e., away from the air offtake inlet 102. Various locations along the second bend 85 may be contemplated. The diameter of the air offtake body 101 can vary, and is illustratively about half of the diameter of the manifold body 81. By way of the oil offtake 90 and air offtake 100, the fluid F entering the manifold 80 at the manifold inlet 82, which contains a mixture of air A and oil O, undergoes a centrifugally-induced separation process so that the fluid F entering the scavenge pump 62 via the manifold outlet 83 is more oil-rich. Stated differently, the fluid F exiting the manifold 80 has a higher ratio of oil O to air A than the fluid F entering the manifold 80, thereby increasing the efficiency and efficacy of the oil system 20.

Referring now to FIG. 5, another embodiment of a manifold 80 is shown. Unless otherwise specified, like reference numerals refer to like elements. In this embodiment, in lieu of an oil offtake, the oil isolator is a wall 90', also referred to as a separator wall or a divider, adapted to provide separate flow paths for the oil O and air A along a length of the wall 90'. The wall 90' includes an elongate body 91' having a leading edge 92' and a trailing edge 93' downstream of the leading edge 92' relative to a flow of the fluid F through the manifold 80. The leading edge 92' is disposed towards the downstream end of the first bend 84, while the trailing edge 93' is disposed towards the downstream end of the second bend 85. In some embodiments, the wall 90' fully separates the interior of the manifold body 81 into two fluidly-isolated flow paths so that the fluid F on either side of the wall 90' does not mix.

In the shown case, the leading edge 92' is disposed immediately downstream of the first bend 84, i.e., where the manifold body 81 becomes straight after the first bend 84. As such, the oil O directed towards the radially outer portion of the first bend 84 is then directed to an oil flow path on a first side of the wall 90', while the air A directed towards the radially inner portion of the first bend 84 is then directed to an air flow path on a second side of the wall 90'. In this embodiment, the air offtake inlet 102 adjacent the second bend 85 is disposed radially outwardly of the wall 90' along the second bend 85 so that it is in fluid communication with the air flow path on the second side of the wall 90'. As such, oil O on the first side of the wall 90' is directed towards the manifold outlet 83 and scavenge pump 62, while air O on the second side of the wall is directed through the air offtake 100 and away from the scavenge pump.

The location of the trailing edge 93' within the manifold 80 may vary. In the shown case, the trailing edge 93' is disposed towards the downstream end of the second bend 85, and thus downstream of the air offtake inlet 102. In other cases, the trailing edge 93' can be disposed midway through the second bend 85 but still at least adjacent, and preferably downstream of, the air offtake inlet 102. As such, oil O on the first side of the wall 90' is prevented from entering the air offtake inlet 102. In some embodiments, the trailing edge may abut an inner wall of the manifold body 81, thereby fluidly separating the air flow path on the second side of the wall 90' from the manifold outlet 83 and further minimizing the quantity of air A in the fluid F as it exits the manifold 80. Other locations for the leading and trailing edges 92', 93' may be contemplated.

In the above-disclosed embodiments, it is understood that the separation of oil O and air A from the fluid F by way of the oil isolator (oil offtake 90 or wall 90') and air offtake 100 may not be complete, and the fluid F exiting the manifold 80 may contain some air A. In addition, it is contemplated to provide a manifold 80 having an oil offtake 90 as well as a wall 90' to provide additional separation capacity. Other modifications to the above-described manifolds 80 may be contemplated as well.

According to the present disclosure, there is provided an exemplary method of operating an oil system 20 in an aircraft engine 10. A fluid F containing a mixture of air A and oil O is recovered from an engine component 50 of the aircraft engine 10 and is flowed through an inlet 82 of a manifold 80, the manifold having an outlet 83 fluidly coupled to a scavenge pump 62. Oil O is separated from the fluid F at a first bend 84 in the manifold 80 and directed to the scavenge pump 62. Air A is separated from the fluid F at a second bend 85 in the manifold 80 and directed away from the scavenge pump 62. Various additions and modifications to the above-listed steps may be contemplated.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the present disclosure teaches a manifold for separation of oil from air, it is contemplated to utilize the manifold to separate other non-homogeneous mediums of different densities, for instance at different locations in the engine. In addition, while the above-described manifolds include two bends and up to two offtakes, manifolds having other numbers of bends and offtakes may be contemplated. Yet further modifications could be implemented by a person of ordinary skill in the art in view of the present disclosure, which modifications would be within the scope of the present technology.

The invention claimed is:

1. An oil system for an aircraft engine, comprising:
   an oil tank;
   an engine component in fluid communication with the oil tank, a fluid containing a mixture of air and oil being discharged from the engine component;
   a scavenge pump having a scavenge pump inlet fluidly connected to the engine component and a scavenge pump outlet fluidly connected to the oil tank; and
   a manifold disposed inside a scavenge pump housing and fluidly connecting the engine component to the scavenge pump, the manifold having a manifold inlet fluidly connected to the engine component and a manifold outlet fluidly connected to the scavenge pump inlet, the manifold including a fluid passage extending between the manifold inlet and the manifold outlet, the fluid passage including a first bend and a second bend, the first bend being upstream from the second bend, the first bend including an oil isolator and the second bend including an air offtake, the oil isolator separating an oil fraction from the fluid at the first bend and directing the oil fraction to the scavenge pump, the air offtake separating an air fraction from the fluid at the second bend and directing the air fraction away from the scavenge pump.

2. The oil system as defined in claim 1, wherein the oil isolator includes an oil offtake disposed at a radially outer portion of the first bend, the oil offtake flowing the oil fraction to the scavenge pump.

3. The oil system as defined in claim 2, wherein an inlet to the oil offtake is fluidly coupled to the manifold in a direction substantially tangent to the first bend.

4. The oil system as defined in claim 2, wherein an inlet to the oil offtake is fluidly connected to the manifold at a location corresponding to an angle of at least 60 degrees along the first bend with respect to a plane upstream of the first bend, the plane extending normally through the manifold.

5. The oil system as defined in claim 2, wherein an outlet of the oil offtake is fluidly connected to the manifold at the manifold outlet.

6. The oil system as defined in claim 1, wherein the oil isolator includes a wall inside the manifold, the wall extending from a leading edge downstream of the first bend to a trailing edge, the wall forming a first flow path and a second flow path fluidly isolated from the first flow path along a length of the wall.

7. The oil system as defined in claim 6, wherein the leading edge is disposed downstream of the first bend.

8. The oil system as defined in claim 6, wherein the trailing edge is disposed downstream of the air offtake.

9. The oil system as defined in claim 8, wherein the trailing edge fluidly separates the second flow path from the manifold outlet.

10. The oil system as defined in claim 1, wherein the manifold is disposed inside a housing of the scavenge pump.

11. A scavenge pump assembly for an aircraft engine, comprising:
a scavenge pump housing;
a scavenge pump disposed inside the scavenge pump housing; and
a manifold adapted to flow a fluid containing a mixture of air and oil to the scavenge pump, the manifold including a manifold inlet, a manifold outlet fluidly connected to the scavenge pump, and a fluid passage extending between the manifold inlet and the manifold outlet, the fluid passage including a first bend and a second bend, the first bend being upstream from the second bend, the first bend including an oil isolator and the second bend including an air offtake, the oil isolator separating an oil fraction from the fluid at the first bend and directing the oil fraction to the scavenge pump, the air offtake separating an air fraction from the fluid at the second bend and directing the air fraction away from the scavenge pump.

12. The scavenge pump assembly as defined in claim 11, wherein the oil isolator includes an oil offtake having an oil offtake inlet disposed at a radially outer portion of the first bend and an oil offtake outlet in fluid communication with the scavenge pump.

13. The scavenge pump assembly as defined in claim 12, wherein the oil offtake inlet is fluidly coupled to the manifold in a direction tangent to the first bend.

14. The scavenge pump assembly as defined in claim 12, wherein the oil offtake inlet is fluidly connected to the manifold at a location corresponding to an angle of at least 60 degrees along the first bend with respect to a plane upstream of the first bend, the plane extending normally through the manifold.

15. The scavenge pump assembly as defined in claim 12, wherein the oil offtake outlet is fluidly connected to the manifold at the manifold outlet.

16. The scavenge pump assembly as defined in claim 11, wherein the oil isolator includes a wall inside the manifold, the wall extending from a leading edge downstream of the first bend to a trailing edge, the wall forming a first flow path and a second flow path fluidly isolated from the first flow path along a length of the wall.

17. The scavenge pump assembly as defined in claim 16, wherein the leading edge is disposed downstream of the first bend.

18. The scavenge pump assembly as defined in claim 16, wherein the trailing edge is disposed downstream of the air offtake.

19. The scavenge pump as defined in claim 16, wherein the trailing edge fluidly separates the second flow path from the manifold outlet.

20. A method of operating an oil system in an aircraft engine, comprising:
flowing a fluid containing a mixture of air and oil recovered from an engine component of the aircraft engine through an inlet of a manifold, the manifold having an outlet fluidly coupled to a scavenge pump;
separating oil from the fluid at a first bend in the manifold and directing the oil to the scavenge pump; and
separating air from the fluid at a second bend in the manifold and directing the air away from the scavenge pump.

* * * * *